United States Patent Office 3,210,418
Patented Oct. 5, 1965

3,210,418
PREPARATION OF ALIPHATIC
DIHALOPHOSPHINES
John A. Pianfetti, Charleston, W. Va., assignor to FMC
Corporation, a corporation of Delaware
No Drawing. Filed Oct. 19, 1953, Ser. No. 387,027
4 Claims. (Cl. 260—543)

This invention relates to halophosphines, and more particularly to aliphatic substituted halophosphines, to a novel method of preparing such compounds and to novel members of this group of compounds. Many of these compounds have pronounced utility as toxicants and all are useful as chemical intermediates.

Prior art methods of preparing these compounds involve various complicated techniques and other numerous disadvantages. One of the earliest methods developed was that involving the use of mercury derivatives, such as dialkyl mercury or diaryl mercury derivatives, which were heated with phosphorus trichloride in sealed tubes for several hours at a temperature of about 180–230° C. The use of phosphorus tribromide resulted in the formation of the corresponding bromophosphines. The reaction was also used to prepare monohalophosphines. Aside from the difficulties of the preparation technique, the compounds were contaminated with mercury-containing impurities which were very difficult to eliminate.

Another prior art method developed for the preparation of both aliphatic and aromatic derivatives involved the refluxing for many hours of a mixture of a hydrocarbon, phosphorus trichloride and a substantial proportion of aluminum chloride. It was necessary that the aluminum chloride be of high purity and the amount appear to be critical. The isolation technique was quite involved and troublesome residues were an additional disadvantage. Yields were quite low. U.S. Patent 2,137,792 states that the reaction does not occur with aliphatic hydrocarbons containing less than six carbon atoms in the molecule.

Unsuccessful prior art efforts were reported in attempting to effect a reaction between a hydrocarbon and phosphorus trichloride at elevated temperatures, only benzene appearing to give any positive results whatsoever. Negative results were obtained with aliphatic hydrocarbons. The technique consisted of recycling a gaseous mixture of a phosphorus trichloride and hydrocarbon through a red hot tube, using an inert atmosphere, such as nitrogen or carbon dioxide, as a safety measure.

The prior art also reports that the reaction between phosphorus trichloride and the unsaturated hydrocarbon butene results in the formation of an addition compound, the reaction involving the refluxing of the liquids in the presence of a catalyst.

An important object of this invention is to provide a practical method for the preparation of substituted halophosphines.

Another object is to provide such a method for the preparation of aliphatic halophosphines.

Another object is to provide a method for the preparation of aliphatic dichlorophosphines.

Another object is to provide a novel catalytic technique for the preparation of substituted halophosphines.

Another object is to provide new members of the halophosphine group of compounds and a method for the preparation of such compounds.

Other objects will be obvious to those skilled in the art from a consideration of the description and claims which follow.

In accordance with the foregoing objects, this invention broadly comprises a method for the reaction between a halophosphine and a hydrocarbon, or substituted hydrocarbon, involving passing a gaseous mixture of the reactants through a heated reactor zone under controlled conditions, and separating the desired—and in some cases novel—products from the reacted mixture. An additional important and novel development comprises the use of a homogeneous (gaseous) catalyst in this reaction to obtain markedly improved results.

The reaction is particularly important in providing a new method for the preparation of aliphatic substituted halophosphines, which have heretofore been prepared only by the entirely different and more involved techniques of the prior art, indicated in part above. The reaction is especially useful in preparing a preferred class of halophosphines, the aliphatic dichlorophosphines. The reaction has led to the preparation and discovery of new substituted halophosphines, notably vinyl dichlorophosphine, which have not previously been reported in the chemical literature.

Although the reaction is novel, interesting and practical in the absence of any catalytic material, markedly improved results are obtained in the presence of homogeneous (gaseous) catalysts, which may be introduced as a part of the gaseous reactants mixture. Up to 1 mol percent of catalyst is usually ample, and often much less than this amount was used.

While I do not which to be limited to any particular theory of the reaction utilizing a homogeneous catalyst, it appears that the reaction may proceed by formation of free radicals, and I have indeed found that superior results are obtained with some of the gases, such as oxygen, halogen, nitrogen oxides, etc., which are commonly considered to function as promoters of free radicals. An extensive treatment of this theory and a listing of numerous suitable substances are found in a publication by Steacie, "Atomic and Free Radical Mechanisms."

The form of the apparatus is not critical, so long as it is designed in such a manner as to effect the reaction under the conditions outlined herein. One form of reactor which has been used successfully comprises a silica tube, of 24 mm. outer diameter, placed in an annular furnace about 33 cm. long. A sliding thermocouple in a 7 mm. tube concentric with the reactor tube permitted temperature measurements to be taken within the heated section. The heated section of the tube may suitably contain an inert packing material, such as broken quartz, of a size which passes through a 4-mesh screen, in order to better control and equalize the temperature. In some instances, unproved results are obtained by using a catalytic material, such as activated silica or alumina, in place of an inert packing. The hot zone of the reactor tube was about 12–14 cm. long and this was considered to be the reaction zone.

Accessory equipment included an electrically heated reservoir for maintaining the phosphorus trihalide in the liquid state, and a conventional condensing system for separating the various components of the reaction of the gaseous reaction product. In one convenient method of forming gaseous mixtures, the gaseous hydrocarbon or substituted hydrocarbon is passed through the liquid phosphorus trihalide, which is maintained at a proper temperature to evaporate the desired proportion of phosphorus trihalide. The mixture of phosphorus trihalide and the hydrocarbon reactant is then passed through the reactor, heated by the furnace and the reaction products cooled, fractionally condensed, collected, separated and analyzed.

Residence time in the reactor tube was calculated by the following formula:

$$\text{Residence time} = \frac{F \times r^2 \pi L P \theta}{100 \Sigma n R T}$$

$F$ = percent of volume of tube in the furnace that was not filled with packing, usually 50%
$r$ = internal radius of tube = 1 cm.
$L$ = length of zone in tube wherein temperature was within 50° C. of the highest temperature within the tube = 12–14 cm.
$P$ = pressure = 760 mm.
$T$ = temperature, degrees Kelvin
$R$ = gas constant = 82.06 cc. atmosphere $K^{0-1}$ g. $mol^{-1}$
$\theta$ = time of the experiment in seconds
$\Sigma n$ = total number of gram-moles of gas through tube in time $\theta$ The temperature maintained in the reaction zone of the reactor depends in part upon the reactants being used, since the thermal reactivity and stability of chemical compounds, of course, varies considerably. For example, it is generally known that in the series phosphorus trichloride, phosphorus tribromide and phosphorus triiodide, the reactivity increases within the series, in the order given, for any specified temperature. The same general comments may be made for various hydrocarbons and for various substituted hydrocarbons. Thus, unsubstituted hydrocarbons are in general more reactive than the saturated type, and branched hydrocarbons are more reactive than the unbranched. With regard to substituted hydrocarbons, the nature of the substituent group has a very important effect upon the reactivity, and in the instant reaction certain types of compounds may obviously not be used, since they would lead to undesirable side reactions. For example, amines and amides would react to form salt like products, or other substituted ammonium derivatives.

In general, the reaction temperature may range from that at which no reaction at all occurs, in the vicinity of 300° C., in some cases, to a temperature so high that the desired products of the reaction thermally decompose to an undesirable extent, say on the order of 800–900° C., in the case of some compounds. For most compounds, especially the unsubstituted aliphatic hydrocarbons, the preferred temperature range is about 550–750° C. Some aromatic hydrocarbons may react best at slightly higher temperatures, benzene for example reacting best at about 700–750° C. at the particular contact time used in many of the trial runs. However, aside from the thermal stability of the reactants and products, it must be remembered that the reaction time is interdependent upon the temperature, so that some reactions may be conducted for a short time at a high temperature without excessively adverse results or, conversely, may be conducted at substantially lower temperatures for a longer reaction time and still obtain favorable results.

The time of the reaction, as indicated in the previous paragraph, is dependent in part upon the reactivity of the reactants and the thermal stability of the products. In general, however, the reaction time is measured in terms of seconds, and may be controlled by the design of the reactor and the operating technique. The preferred reaction time for many reactants ranges from a fraction of a second up to several seconds, depending upon the foregoing considerations. Where insufficient reaction is obtained, one expedient which may be utilized is to recycle the reaction mixture either before or after partial removal of some of the reaction products and with or without the enrichment of the recycled mixture by the addition of more of the reactants.

The proportions of the reactants may vary within wide limits, but I prefer to use a proportion which is somewhere near the stoichiometric quantities indicated by the the theory of the reaction. For the preparation of a mono-substituted halophosphine, this means that equimolar quantities are indicated. For the preparation of di-substituted halophosphines, 2 moles of the carbonaceous reactant are required for 1 mole of phosphorus halide.

In a study of the effect of the mole ratio on the conversion, the reaction was carried out at 590° C. in a pressure reactor, using methane (39 moles), phosphorus trichloride (18.5 moles) and oxygen (0.6 mole). A conversion of 12.6% was obtained at this methane to phosphorus trichloride ratio of 2:1. In a similar experiment, methane (63 moles), phosphorus trichloride (8.2 moles) and oxygen (0.7 mole) were allowed to react at 590° C. A conversion of 23% was obtained at this 7:7 methane to phosphorus trichloride ratio. Other experiments at intermediate ratios gave conversion values which fell on a smooth curve when conversions were plotted against ratios, and showed clearly that the use of higher ratios lead to higher conversions. However, product recovery becomes more difficult at the higher ratios; hence, a compromise must be made somewhere along the line in order to achieve the most economical process.

The particular ratio selected is dependent in part upon such reaction conditions as time, temperature, and presence or absence of catalyst. Also, as noted, excessive proportions of one reactant may needlessly complicate the recovery and isolation procedure. As a specific example of a compromise, it was found that in the reaction between methane and phosphorus trichloride a mole ratio of 2 to 5 was satisfactory.

The reaction may be conducted under pressure if desired, or it may also suitably be conducted at subatmospheric pressures. Since the reaction does not theoretically involve a reduction in volume, the use of superatmospheric pressure does not appear to be warranted in view of the more elaborate equipment required. However, for some types of reactants, it is preferable to conduct the reaction under pressure in order to increase the productivity of a given size reactor. The recovery techniques may also be improved in some cases by the use of pressure, due to the effect of pressure on liquefaction temperatures of the reaction product components.

The invention will now be illustrated by a description of some specific reactions, but it is to be understood that these examples are illustrative only, and are not to be construed as limiting the scope of this invention. In these examples, "conversion" and "yield" are defined as follows:

"Conversion" is the moles of desired product divided by moles of the reactant under consideration. "Yield" is the moles of the desired product divided by the moles of the reactant disappearing in the synthesis, i.e., moles of reactant fed minus moles of reactant recovered. This and the preceding value are generally multiplied by 100 and expressed as percent.

*Example 1*

Using the reactor described above, methane gas was passed through a reservoir of phosphorus trichloride yielding a gaseous mixture containing a methane to phosphorus trichloride ratio of 4:8. This mixture was passed through the reactor heated to a temperature of 575° C. in the reaction zone, at a residence time of 0.2 second. The exit gases were cooled, condensed, collected, separated and analyzed. Methyl dichlorophosphine was obtained in a conversion corresponding to 1.4% of the phosphorus trichloride fed. In this case, the methyl dichlorophosphine was determined by an infrared analytical method. In other experiments, by actual isolation of the product, it has been shown that methyldichlorophosphine boils at 82° C. at 760 mm. and has a specific gravity of 1.280 at 35/4° C.

*Example 2*

In a reaction similar to that described in Example 1, a mixture of methane (45.0 moles) and phosphorus trichloride (7.8 moles), mole ratio 5.7:1, but additionally containing 0.9 mole of air used to furnish oxygen as a homogeneous catalyst, was passed through the reactor maintained at 575° C., with a residence time of 0.3 second. The conversion of methyl dichlorophosphine was 17 mole percent of the phosphorus trichloride used.

*Example 3*

In another run using oxygen (air) as a catalyst, methane (7.5 moles) and phosphorus trichloride (1.3 moles) and 0.4 mole of air were passed through the reactor at a temperature of 575° C. and a residence time of 0.3 second. The conversion of methyl dichlorophosphine was 19 mole percent of the phosphorus trichloride used.

*Example 4*

In another run using ethane, the gaseous mixture passed through the reactor consisted of 9.0 moles of ethane, 1.88 moles of phosphorus trichloride and 0.11 mole of oxygen gas. The temperature was 575° C. and the residence time was 0.3 second. The liquid product weighed 230 g. and had a specific gravity of 1.479 35/4° C., corresponding to a conversion of about 20%. On rectification, a product was obtained boiling at 111° C., at 750 mm. pressure, having a specific gravity of 1.250 35/4° C. The product analyzed 23.9% phosphorus (theory 23.6%) and 53.8% chlorine (theory 53.8%). The conversion of the product was 15 mole percent based on the phosphorus trichloride used.

*Example 5*

Twenty-four moles of gaseous ethylene were passed through liquid phosphorus trichloride held at 35° C. Six moles of phosphorus trichloride were vaporized during an 8.5 hour period. To the mixture was added 1% of its volume of oxygen, and the whole fed into the small furnace described previously heated to 600° C. The product was condensed by cooling with Dry Ice. The recovered liquid (690 g.) had a specific gravity of 1.508 35/4° C., which indicated a phosphorus trichloride conversion of about 12%. The liquid was rectified and yielded a compound boiling at 103° C. at 750 mm., and having a specific gravity of 1.328–35/4° C., a phosphorus content of 22.2% and a chlorine content of 57.0%. Theory for vinyl dichlorophosphine, $C_2H_3PCl_2$, is 23.0% phosphorus and 55.1% chlorine. The compound is vinyl dichlorophosphine, contaminated by a small amount of phosphorus oxychloride, B.P. 105° C. at 750 mm., which is very difficult to completely remove. This compound is a new composition of matter.

*Example 6*

In an experiment similar to the previous one, butane (24 moles), phosphorus trichloride (5.3 moles) and oxygen (0.29 mole) were passed through the reactor at 600° C. over a six hour period. Rectification and infrared analysis of the entire product, which was divided into 4 fractions of successively higher boiling points, showed the presence of about 11% methyl dichlorophosphine in Fraction A, corresponding to a phosphorus trichloride conversion of about 8%. Indications of the presence of ethyl, propyl, and butyl dichlorophosphine were noted in Fractions B, C, and D, but because of the small amount (about 2% conversion) and the complexity of the mixture, no attempt was made to analyze or otherwise identify the mixture components.

*Example 7*

Methane (390 moles), phosphorus trichloride (79 moles) and oxygen (4.5 moles) were passed through a reactor at 600° C. This reactor resembled the quartz unit, but was constructed of nickel, copper and stainless steel. The product (9000 g.) was recovered by low temperature condensation. Analyses showed a 16% conversion and a 90% yield of methyl dichlorophosphine, based on phosphorus trichloride.

*Example 8*

Using the procedure of Example 1, methane (7.5 moles), phosphorus trichloride (1.45 moles) and chlorine (0.06 mole) were reacted, giving a 9% conversion, over six times that obtained in the absence of catalyst.

*Example 9*

In a reactor similar to that described in Example 1, benzene (6.9 moles) and phosphorus trichloride (1.72 moles) were vaporized, and passed through the reactor heated to 725° C. On rectification of the products, 32.5 grams of phenyl dichlorophosphine, boiling from 89° to 94° at 10 mm., and having a specific gravity of 1.288 was isolated. The product recovered corresponded to a conversion of 10.5%.

*Example 10*

In an experiment comparable to Example 9, but including an oxygen catalyst, using benzene (7.8 moles), phosphorus trichloride (1.94 moles), and oxygen (0.08 mole) as a catalyst, 59 grams of material boiling in a similar range was isolated, which corresponded to a conversion of 17%, an increase of over 60% when compared to the non-catalytic experiment.

*Example 11*

By the apparatus and method of Example 1, chlorobenzene (4.54 moles) and phosphorus trichloride (1.14 moles) were passed through the reactor at 700° C. Based on the isolated product (26.8 g.) a conversion of 11.0% to chlorophenyl dichlorophosphine was obtained.

*Example 12*

Repetition of an experiment similar to Example 11 with chlorobenzene (4.57 moles), phosphorus trichloride (1.14 moles), and oxygen (0.056 mole) resulted in the isolation of 34.3 grams of product, corresponding to a conversion of 14.1%, or an increase of 28% over the non-catalytic experiment.

The foregoing examples are illustrative of the many compounds that may be prepared by the method of this invention. It is obvious that the invention has a wide scope of applicability and that many other compounds may be prepared by following my teachings. Among the new compounds which have been isolated and identified through the use of this novel method is vinyl dichlorophosphine ($C_2H_3PCl_2$), as indicated in Example 5.

From a consideration of the foregoing description and illustrative examples, it will be obvious to those skilled in the art that the teachings of this invention may be readily adapted to the preparation of compounds other than those disclosed, and that the conditions may be modified to a certain extent and still obtain the benefits of this discovery. All of these embodiments of the invention are considered to fall within the scope of the claims below.

That which is claimed as new is:

1. The method for the preparation of an aliphatic substituted dihalophosphine by a substitution reaction, with hydrogen halide as a co-product, comprising preparing a gaseous mixture of a phosphorus trihalide and a lower aliphatic hydrocarbon, passing the mixture rapidly through a reaction zone in which the temperature is maintained between about 300 and 900° C., and recovering the substituted dihalophosphine from the reaction product.

2. The method for the preparation of an aliphatic substituted dihalophosphine by a substitution reaction, with hydrogen halide as a co-product, comprising preparing a gaseous mixture of a phosphorus trihalide and a lower aliphatic hydrocarbon, passing the mixture through a reaction zone in which the temperature is maintained between about 300 and 900° C. for a period of time from about 0.1 second to about 60 seconds, and recovering the substituted dihalophosphine from the reaction product.

3. The method of claim 2, wherein the temperature in the reaction zone is within the range of about 550–750° C.

4. The method for the preparation of an aliphatic substituted dihalophosphine by a substitution reaction, with hydrogen halide as a co-product, comprising preparing a gaseous mixture of a phosphorus trihalide and a lower aliphatic hydrocarbon, passing the mixture through a reaction zone in which the temperature is maintained between about 300 and 900° C. for a period of time from about 0.01 second to about 60 seconds in the presence of a gaseous catalyst selected from the group consisting of oxygen, halogen, and nitric oxides, and recovering the substituted dihalophosphine from the reaction product.

References Cited by the Examiner
UNITED STATES PATENTS 2,685,602  8/54  Woodstock et al. _____ 260—543

OTHER REFERENCES

Kharasch et al.: J.A.C.S. (1945), vol. 67, p. 1864.

Organo-Phosphorus Compounds, Kosolapoff, New York, John Wiley and Sons, Inc. (1950), pp. 48–9.

LORRAINE A. WEINBERGER, *Primary Examiner.*

WILLIAM G. WILES, LEON D. ROSDOL, CARL D. QUARFORTH, *Examiners.*

UNITED STATES PATENT OFFICE
CERTIFICATE OF CORRECTION

Patent No. 3,210,418                              October 5, 1965

John A. Pianfetti

It is hereby certified that error appears in the above numbered patent requiring correction and that the said Letters Patent should read as corrected below.

Column 1, lines 33 and 34, for "appear" read -- appeared --; column 2, line 26, for "which" read -- wish --; line 49, for "unproved" read -- improved --; column 3, line 69, strike out "the", first occurrence; column 5, line 40, for "1.328-35/4° C." read -- 1.328 35/4° C. --.

Signed and sealed this 6th day of September 1966.

(SEAL)
Attest:

ERNEST W. SWIDER                             EDWARD J. BRENNER
Attesting Officer                                 Commissioner of Patents